Jan. 23, 1934.     E. G. PURDY     1,944,668
MOTOR VEHICLE
Filed April 7, 1931     4 Sheets-Sheet 1
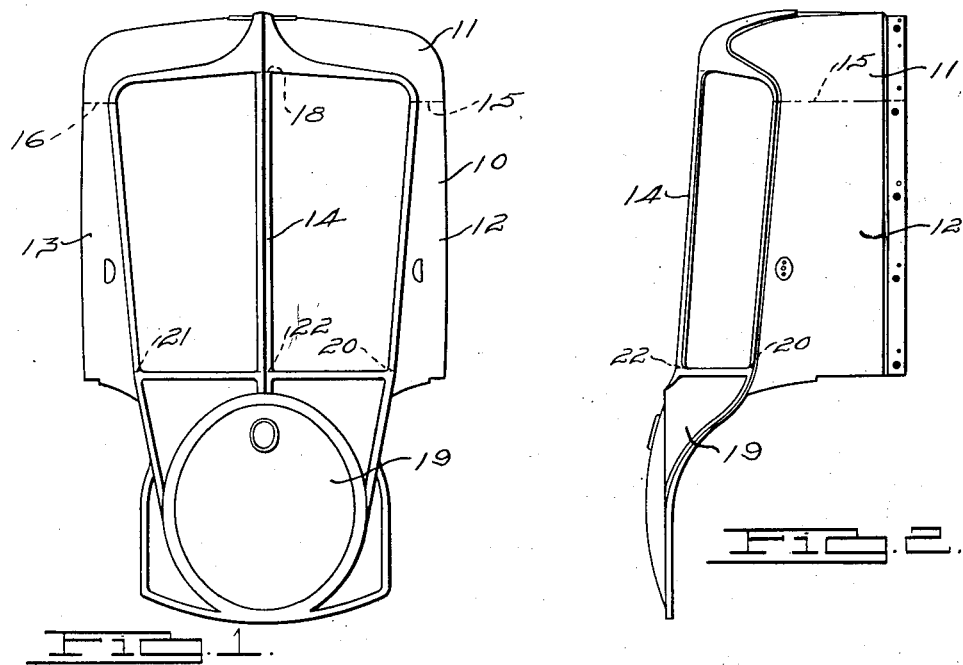
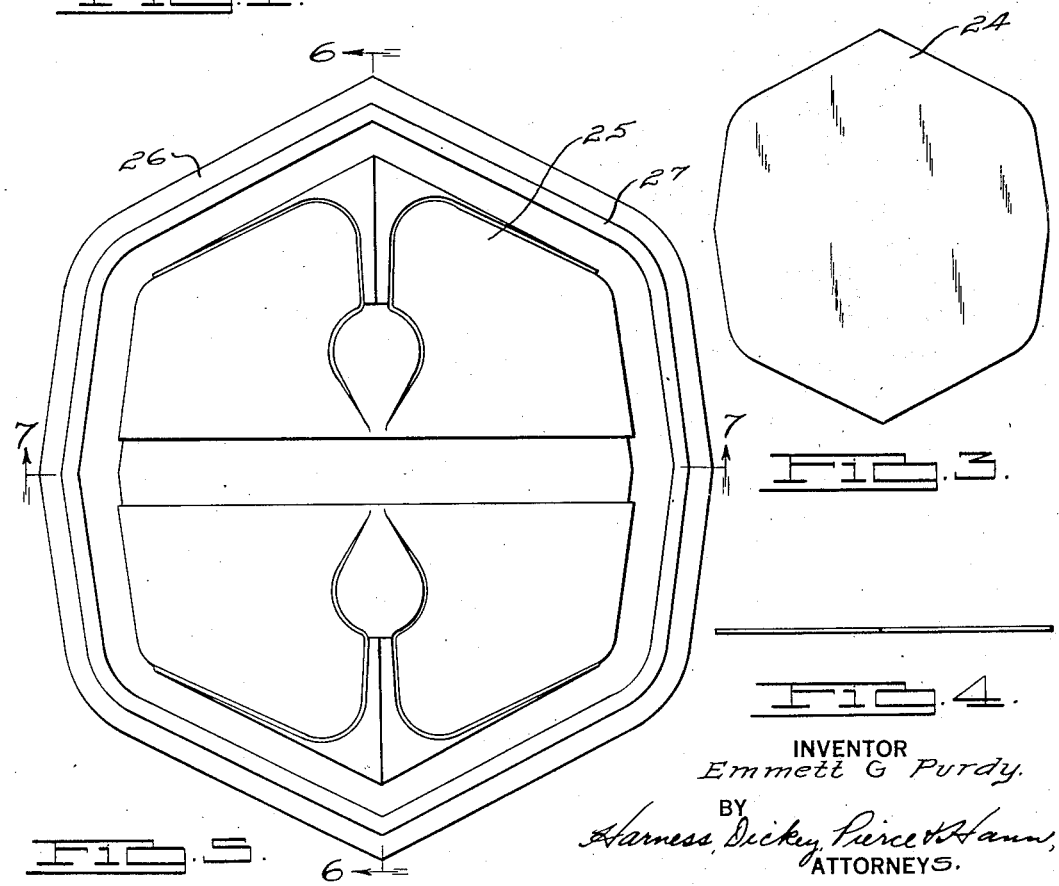
INVENTOR
Emmett G Purdy.
BY
Harness, Dickey, Pierce & Hann,
ATTORNEYS.

Jan. 23, 1934.  E. G. PURDY  1,944,668
MOTOR VEHICLE
Filed April 7, 1931   4 Sheets-Sheet 2

INVENTOR
Emmett G. Purdy
BY
Harness, Dickey, Pierce & Ham
ATTORNEYS.

Jan. 23, 1934.   E. G. PURDY   1,944,668
MOTOR VEHICLE
Filed April 7, 1931   4 Sheets-Sheet 3
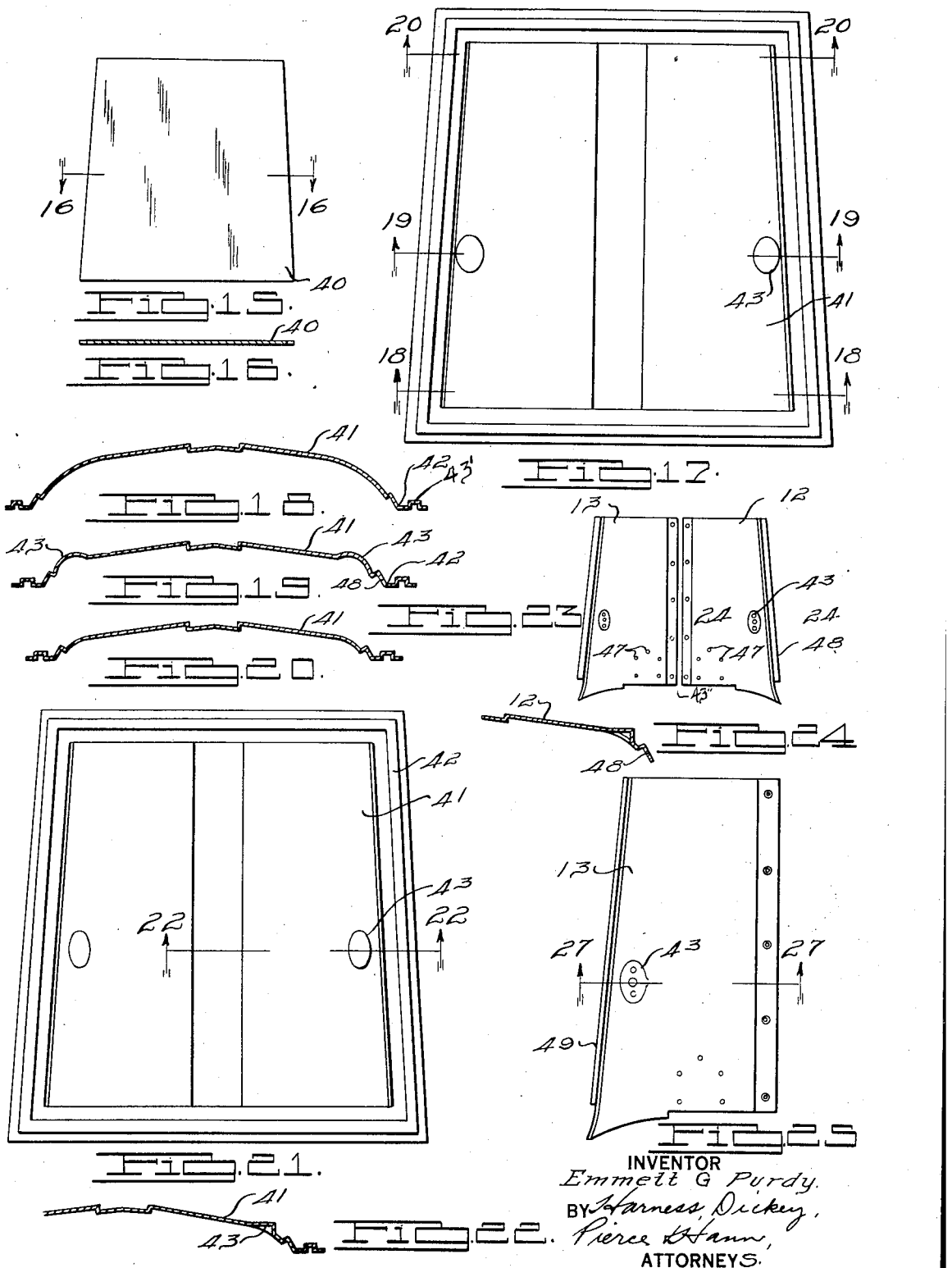

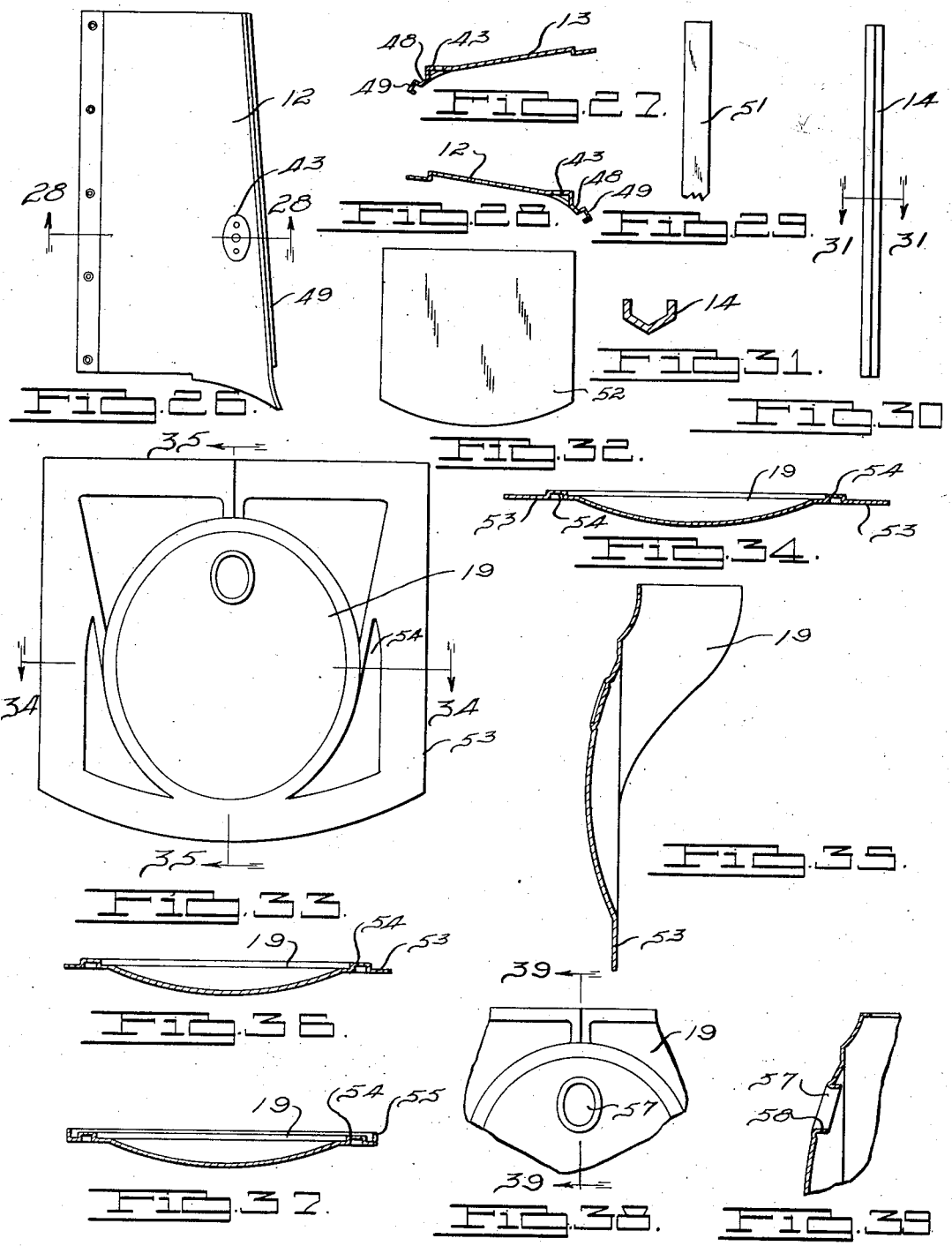

Patented Jan. 23, 1934

1,944,668

UNITED STATES PATENT OFFICE 1,944,668

MOTOR VEHICLE

Emmett G. Purdy, Detroit, Mich., assignor to Detroit Body Die Company, a corporation of Michigan Application April 7, 1931. Serial No. 528,335

3 Claims. (Cl. 113—116)

The invention relates to motor vehicles and has particular relation to a method of manufacturing radiator shells having transmission covers integrally associated therewith.

One object of the invention is to provide a method of manufacturing articles of the above designated character which will largely eliminate the metal drawing operations ordinarily required in their manufacture.

Another object of the invention is to provide a method of manufacturing such articles by means of which undesirable stresses, resulting from drawing the metal, will be decreased if not entirely obviated.

Another object of the invention is to provide a method of manufacturing such articles by means of which the time, labor and expense required in their manufacture will be reduced considerably.

Ordinarily, in the manufacture of radiator shells for motor vehicles it is the practice to draw a piece of flat sheet metal by means of dies utilized for this purpose until the shell assumes a predetermined form. Forming the shell in this manner requires a large number of operations which progressively shape the article and accordingly much time, labor and expense are involved in their manufacture. Also the repeated drawing operations subject the metal to considerable stress, and while such stress does not seriously injure the metal it is desirable to avoid it.

According to the present invention, parts of the shell are formed separately from individual sheet metal elements and then the complementary parts are welded together. In manufacturing an individual part of the shell in this manner, little if any drawing of the metal is required, and ordinarily each part may be formed by bending the metal. It is relatively simple to bend or perhaps slightly draw individual sheet metal elements until they are complementary one to another and then weld the several parts together as compared to forming the assembly from a single relatively large sheet of metal by repeated drawing operations. Practice of the invention has resulted in a lower cost of manufacture and accordingly in a lower cost to the purchasers of motor vehicles.

For a better understanding of the invention, reference now may be had to the accompanying drawings forming a part of this specification in which:

Figure 1 is an elevational view of a radiator shell having a transmission cover, constructed according to one form of the invention;

Figure 2 is a side view of the construction shown in Figure 1 taken from the right side thereof;

Figure 6:
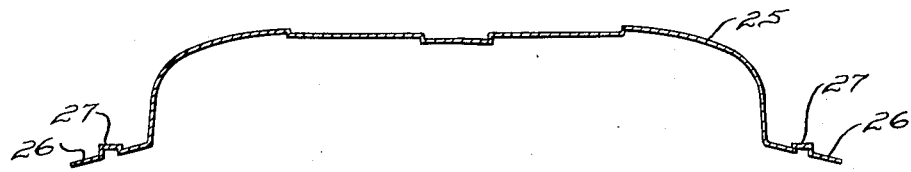
Figure 7:
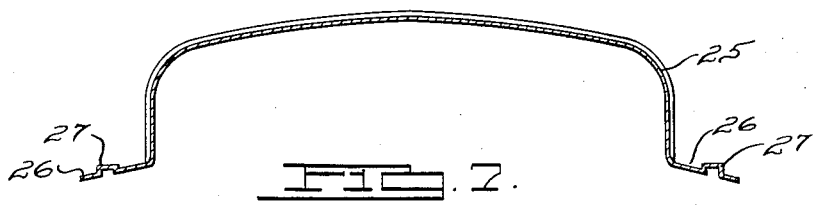

Figures 3 to 14 inclusive relate to the manufacture of the upper part of the radiator shell shown by Figure 1 and illustrate progressively the development and formation of this part of the shell from a single sheet of metal;

Figures 15 to 28 inclusive relate to the manufacture of the two (2) side sections of the radiator shell and progressively illustrate their development from a single sheet metal element;

Figures 29 to 31 inclusive relate to the manufacture of the reinforcing rib located between the side sections of the radiator shell and illustrate the manner in which it is developed from sheet metal; and Figures 32 to 39 inclusive relate to the manufacture of the transmission cover attached to the lower part of the radiator shell shown by Figure 1 and illustrate progressively how it is manufactured from a single sheet metal element.

Referring to Figures 1 and 2, a radiator shell 10 is illustrated which comprises an upper section 11, right and left side sections 12 and 13 respectively, and a central reinforcing member 14. The sections 12 and 13 are welded to the section 11 as indicated at 15 and 16 respectively while the reinforcing rib 14 is welded to the section 11 as indicated at 18. A transmission cover 19 is welded to the lower end of the sections 12, 13 and 14 as indicated at 20, 21 and 22 respectively. While an article of this character might be manufactured from a single sheet metal strip, its manufacture would involve the use of many expensive dies as well as considerable time and labor. According to this invention the several sections previously described are manufactured separately and then welded together and this practice eliminates most of the drawing operations which would be required if the article could be manufactured from a single sheet metal plate.

Figures 3 to 14 inclusive relate to the manufacture of the section 11; Figures 15 to 28 inclusive relate to the manufacture of the side sections 12 and 13; Figures 29 to 31 inclusive, relate to the manufacture of the reinforcing rib 14; and Figures 32 to 39 inclusive relate to the manufacture of the transmission cover 19.

Figure 8:
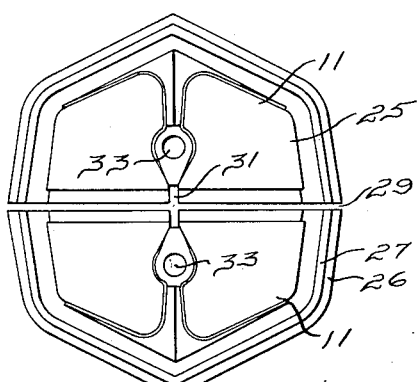
Figure 9:
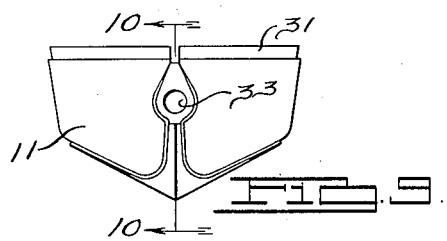

Initially a sheet metal plate 24 of predetermined contour as shown in Figure 3, is developed into a construction 25 shown by Figure 5 by means of a suitable die. The plate 24 is of such dimensions, and the die of such shape that two of the sections 11 ultimately will be developed. In developing the sections in this manner the plate 24 is provided with flanges 26 and channel portions 27 utilized for retaining it in position during its development by means of the die. Then, as shown by Figure 8, the structure 25 is severed as indicated at 29 to provide two of the sections 11, and a slot 31 is formed in each section. Also during this operation each of the sections 11 is provided with a radiator filling opening 33.

Figure 10:
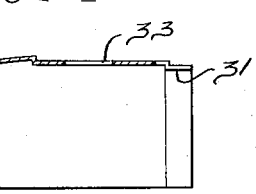
Figure 11:
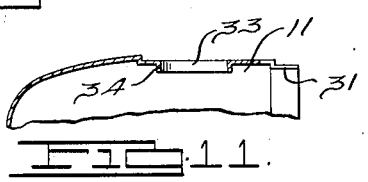
Figure 13:
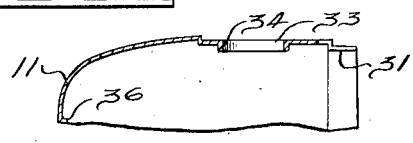
Figure 12:
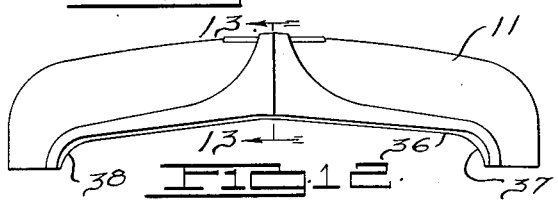
Figure 14:
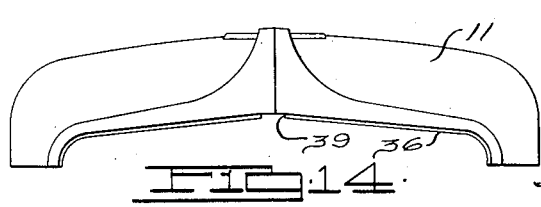

The next step in developing the section 11 is to provide a flange 34 around the filler opening 33 and a comparison of Figures 10 and 11 will illustrate clearly the character of the flange. Then, as shown by Figures 12 and 13, the front part of the section 11 is provided with a flange 36. Development of the section 11 is completed by trimming the flange 36 in the regions 37 and 38 shown by Figure 12 and cutting a slot 39 in the central portion of the flange.

Referring now to Figure 15 a sheet metal plate 40 of predetermined dimensions is utilized for developing sections 12 and 13. Then by means of a suitable die a construction 41 shown by Figure 17 is developed. It will be noted in Figures 18, 19 and 20 that the construction 41 is provided with flanges 42 and 48 and a channel portion 43' utilized for retaining the construction in position during its formation. During development of the construction 41 it is provided with bosses 43 shown by Figures 17 and 19. The next step in developing the construction is to change the contour of the bosses to that form shown by Figures 21 and 24. Then, as shown by Figure 23, the flange 42 is removed from the construction and the periphery of the latter trimmed to predetermined form. Also, during this operation, the construction 41 is severed, as indicated at 43'' to provide the right and left sections 12 and 13. Also various apertures 47 are formed in the sections to provide means for fastening various elements to the sections after the radiator shell is completed. Then, as shown by Figures 25 to 28 inclusive, the flange 48 on each of the sections 12 and 13 remaining after removing the flange 42 is formed with a channel portion 49.

Referring now to Figures 29, 30 and 31, the reinforcing rib 14 is developed from a strip of sheet metal 51. As particularly shown by Figure 31, the rib 14 is of channel shape in cross section.

The transmission cover 19 is developed from a sheet metal plate 52 shown by Figure 32 and the first step in its development comprises changing its form by means of a suitable die in the manner shown by Figure 33. Similarly to the constructions previously described, the cover 19 is provided with a flange 53 around its edge and a channel portion 54. The flange 53 then is partially removed as shown by Figure 36 and the remaining portion bent to provide a flange 55 shown by Figure 37. The last step in developing the cover 19 is to form a crank opening 57 and a flange 58 around the opening, which is illustrated by Figures 38 and 39.

The sections 11, 12, 13, 14 and 19 are developed by drawing the metal only slightly and largely by bending it, and are formed complementary one to another in such manner that they may be assembled in the finished construction shown by Figures 1 and 2. Then the sections are welded in the manner previously described. It is apparent that development of the several sections separately avoids numerous drawing operations which would be necessary if the finished article could be manufactured from a single sheet metal plate by means of repeated drawing operations. Also, it is apparent that the manufacture of the sections separately is relatively simple as compared to the operations which would be required if the sections were manufactured simultaneously from a single metallic sheet. Practice of the invention avoids the use of numerous dies which would be necessary if the completed article were manufactured from a single sheet of metal and accordingly the expense as well as the time and labor ordinarily required are reduced considerably. Moreover, considerable material is saved because in drawing a shell from a single sheet of metal, a considerable portion of the metal must be removed after the shell has been completed.

Although only one form of the invention has been illustrated and described in detail it will be apparent to those skilled in the art that the invention may be modified in various ways without departing from the scope of the appended claims.

I claim:

1. The method of constructing a radiator shell which comprises; cutting a sheet metal plate to a predetermined contour; bending and slightly drawing the metal of said plate to form a piece including halves, each of the general configuration of an upper section of a radiator shell; severing said piece to separate said halves; cutting a second sheet metal plate to a predetermined contour; bending and slightly drawing the metal of said second plate to form a piece including halves, each of the general configuration of a side section of a radiator shell; severing said second named piece to separate the halves thereof; and then welding said second named halves to one of said first named halves to provide an integral construction.

2. The method of constructing a radiator shell which comprises: cutting a sheet metal plate to a predetermined contour; bending and slightly drawing the metal of said plate to form a piece including halves, each of the general configuration of an upper section of a radiator shell; severing said piece to separate said halves; cutting a second sheet metal plate to a predetermined contour; bending and slightly drawing the metal of said second plate to form a piece including halves, each of the general configuration of a side section of a radiator shell; severing said second named piece to separate the halves thereof; cutting a third sheet metal plate to a predetermined contour; bending and slightly drawing the metal of said third plate to form a piece of the general configuration of an integral transmission cover and lower section of a radiator shell; and then welding said second named halves to one of said first named halves and to said third named piece to form an integral construction.

3. The method of constructing a radiator shell which comprises: cutting a sheet metal plate to a predetermined contour; bending and slightly drawing the metal of said plate to form a piece including halves, each of the general configuration of an upper section of a radiator shell; severing said piece to separate said halves; cutting a second sheet metal plate to a predetermined contour; bending and slightly drawing the metal of said second plate to form a piece including halves, each of the general configuration of a side section of a radiator shell; severing said second named piece to separate the halves thereof; cutting a third sheet metal plate to a predetermined contour; bending and slightly drawing the metal of said third plate to form a piece of the general configuration of an integral transmission cover and lower section of a radiator shell; bending a sheet metal strip to channel formation; and then welding said second named halves and said strip to one of said first named halves and to said third named piece to form an integral construction.

EMMETT G. PURDY.